United States Patent

Al-Banna

(10) Patent No.: US 9,363,202 B1
(45) Date of Patent: Jun. 7, 2016

(54) LOW-LATENCY COST-EFFECTIVE UPSTREAM SCHEDULER

(71) Applicant: Ayham Al-Banna, Orland Park, IL (US)

(72) Inventor: Ayham Al-Banna, Orland Park, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 137 days.

(21) Appl. No.: 13/668,928

(22) Filed: Nov. 5, 2012

Related U.S. Application Data (60) Provisional application No. 61/555,552, filed on Nov. 4, 2011.

(51) Int. Cl.
  *H04L 12/28* (2006.01)
  *H04L 12/911* (2013.01)

(52) U.S. Cl.
  CPC .................................. *H04L 47/828* (2013.01)

(58) Field of Classification Search
  CPC ............ H04L 12/1881; H04L 12/2861; H04L 2012/5636
  USPC ........................................................ 370/431
  See application file for complete search history.

(56) References Cited

U.S. PATENT DOCUMENTS

| | | | |
|---|---|---|---|
| 6,370,153 B1* | 4/2002 | Eng .............................. | 370/438 |
| 7,061,929 B1* | 6/2006 | Eberle ................. | H04L 12/5692 |
| | | | 370/423 |
| 2002/0073432 A1* | 6/2002 | Kolze .................... | H04L 5/1438 |
| | | | 725/111 |
| 2007/0140288 A1* | 6/2007 | Boyd et al. ..................... | 370/442 |
| 2008/0151823 A1* | 6/2008 | Quigley et al. ............... | 370/329 |

\* cited by examiner

*Primary Examiner* — Wei Zhao
*Assistant Examiner* — Abdeltif Ajid
(74) *Attorney, Agent, or Firm* — Bart A. Perkins (57) ABSTRACT

Systems, methods and computer readable media for providing low-latency scheduling on upstream channels. Systems and methods can include a low-latency scheduler and a network interface. The low-latency scheduler can assign a first group of upstream channels for standard communication of packets on a network, and to assign a second group of upstream channels for communication of small upstream packets on the network. The network interface can communicate transmission opportunities identified by the low-latency scheduler to the subscriber devices. The transmission opportunities for subscriber devices are assigned such that devices with a threshold amount of traffic receive transmission opportunities in the first group of upstream channels, and subscriber devices with less than the threshold amount of traffic receive transmission opportunities in the second group of upstream channels.

17 Claims, 4 Drawing Sheets

LOW-LATENCY COST-EFFECTIVE UPSTREAM SCHEDULER

CROSS-REFERENCE TO RELATED APPLICATIONS

This application claims priority as a non-provisional of U.S. Patent Application Ser. No. 61/555,552, entitled "Low-Latency Cost-Effective Upstream Scheduler," filed Nov. 4, 2011, which is hereby incorporated herein by reference as if set forth herein in its entirety.

TECHNICAL FIELD

This disclosure relates to upstream transmission scheduling on shared access media.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The growing traffic demand and competition are the main drivers that push the MSOs to offer more bandwidth to their subscribers. Deploying more DownStream (DS) and UpStream (US) channels can be expensive and can therefore put the MSOs at competitive disadvantage. The US spectrum is scarce and the US processing is complex, largely because of the US scheduler, which has to coordinate transmissions of all the users on all the US channels. The complexity of the US scheduler involves a lot of processing power and therefore contributes heavily to the cost of the US channels, which are normally more expensive than the DS channels. Developing a simplified and more effective US scheduler can result in offering more US bandwidth at lower cost.

An example of a simplified US scheduler includes a scheme where only a single Cable Modem (CM) is scheduled at a time for transmission on all US channels. No matter how many US channels or CMs exist in the system, the US scheduler will stay simple. When all CMs have large amount of data to transmit, this simple, efficient, and cost-effective US scheduling algorithm provides an average latency that is comparable to the average latency found in sophisticated US schedulers currently employed in the Cable Modem Termination Systems (CMTSs). However, one disadvantage of this algorithm is that when some CMs have small amount of data for US transmission (e.g., BW requests, station maintenance, voice packets, acknowledgment packets, etc) then they may undergo higher latency than average, which will negatively affect their service. Thus, there is a need for improved upstream scheduling.

BRIEF DESCRIPTION OF THE DRAWINGS

Many details of the disclosure can be better understood with reference to the following drawings. The components in the drawings are not necessarily to scale, emphasis instead being placed upon clearly illustrating the principles of the present disclosure.

Like details in the figures such as reference numbers generally refer to similar, but not necessarily identical features.

DETAILED DESCRIPTION

This disclosure provides solutions to the high latency problem found in the simple US scheduler described above. Instead of the simplified scheduler offering all US channels for the transmission of a single CM, this disclosure describes preferentially using one or more US channels (low-latency US channels) for the transmission of short packets. These dedicated channel(s) can reduce the latency experienced by CMs that have short packets and are waiting for a transmission opportunity when a simplified transmission scheduler is in place on the other channel(s). Note that the low-latency US channels can be of the same/different bandwidth and have the same/different modulation profile as the rest of the channels.

Figure 1:
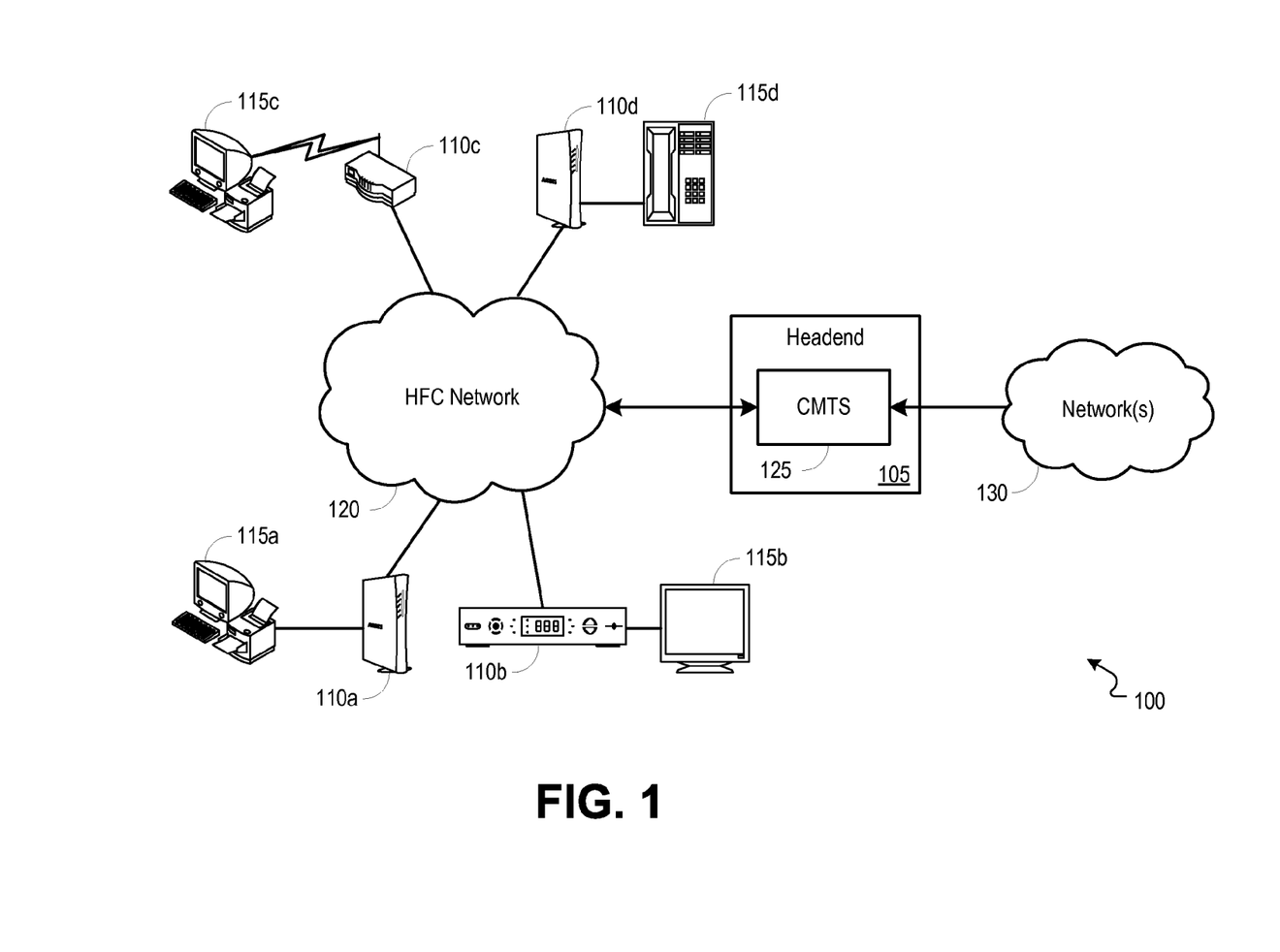
FIG. 1 is a block diagram illustrating a network environment operable to provide low-latency upstream scheduling.

FIG. 1 is a block diagram illustrating a network environment operable to provide low-latency upstream scheduling. In some implementations, a headend 105 can provide video, data and/or voice service(s) to customer premise equipment (CPE) devices 110a-d in one or more subscriber groups (e.g., service group(s)). The CPE devices can include, for example, a cable modem 110a, a set top box 110b, a wireless router including an embedded cable modem 110c, or a media terminal adapter (MTA) 110d, among others. A cable modem 110a can facilitate communications from the headend 105 to a computer 115a. A set top box 110b can facilitate communications from the headend 105 to a television 115b or a digital video recorder. A wireless router 110c can facilitate wireless communications with a computer 115c to a headend 105. An MTA 110d can facilitate communications between a telephone 115d to a headend 105.

Various of the CPE devices 110a-d can communicate both to and from the headend 105 via a hybrid fiber-coax (HFC) network 120. The headend 105 can include devices such as a cable modem termination system (CMTS) 125 and/or an edge quadrature amplitude modulation (EQAM) device (not shown), or a combined or converged device (not shown) including multiple edge and/or video or data processing functionalities. Such devices can operate to facilitate communications between a network 130 and the CPE devices 110a-d. In various implementations, the network 130 can include one or more networks internal to the headend and/or one or more networks external to the headend (e.g., one or more extranets, the Internet, etc.).

Data services (e.g., including VoIP, over the top (OTT) video, etc.) can be handled by the headend 105 through a CMTS 125. The CMTS 125 can receive data signals from external device(s) or nodes through network(s) 130. The network(s) 130, for example, can operate using internet protocol (IP), sending data packets to and receiving data packets from the headend 105. In some examples, the CMTS 125 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 130 to the CMTS 125.

In some implementations, the CMTS 125 can forward packets destined for subscribers to a modulation device (e.g., an EQAM) used to modulate the signal onto a carrier waveform. In other implementations, the CMTS 125 can modulate the packets internally and transmit the signal to a combiner for transmission.

The CPE devices 110*a-d* typically receive traffic from the network(s) 130 or the service operator network on downstream channels and transmit traffic from the CPE devices 110*a-d* to the network 130 or service operator network on upstream channels. Because the source on the downstream channels is centralized, the scheduling is simple. However, as described above, scheduling for upstream channels can be very complex.

In an effort to reduce the complexity of the scheduler, in some implementations, a simplified scheduler can be used to offer fewer than all US channels for upstream transmission to a single CM, thereby reserving one or more US channels (low latency US channels) for the transmission of short packets. These reserved channel(s) reduce the latency experienced by CMs that have short packets ready for transmission and are waiting for a transmission opportunity. In various implementations, the low-latency US channels can be of the same/different bandwidth and have the same/different modulation profile as the remainder of the upstream channels.

In one example, the network can include a 12-US channel system. In the simple US scheduler scheme, where one CM is scheduled at a time to transmit on all 12 US channels, CMs may experience higher latency than average and the network will be underutilized for short packet transmissions. However, if one US channel is left for the transmission of short packets, those CMs having short packets to transmit will not experience high latency, while other CMs without short packets would continue to encounter the higher latency on the other (11) US channels. Overall, the average latency would decrease and average throughput would increase.

Figure 2:
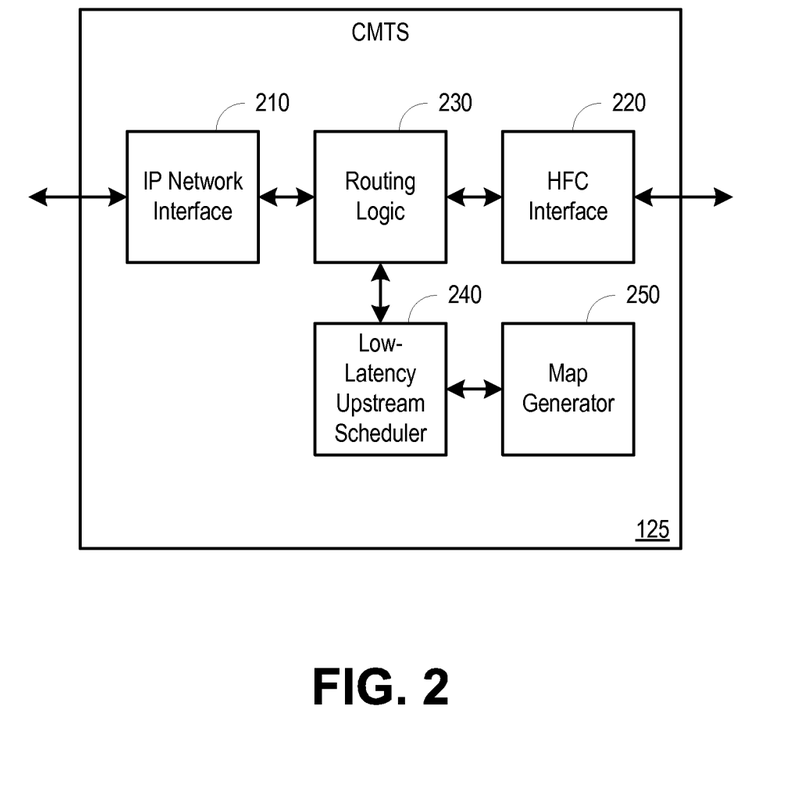
FIG. 2 is a block diagram illustrating an example CMTS including low-latency upstream scheduling.

FIG. 2 is a block diagram illustrating an example CMTS 125 including low-latency upstream scheduling. In a simplified implementation, the CMTS 125 can include an IP network interface 210 and an HFC network interface 220. The IP network interface 210 can be operable to receive IP packets from an IP network (e.g., the internet), the packets being transmitted to an entity (e.g., CPE device) connected to the HFC network or to the CMTS 125 itself. The IP network interface can include components operable to modulate the baseband signal onto a carrier signal for the network.

The HFC network interface 220 can be operable to receive and transmit data over the HFC network. The HFC network typically operates by communicating DOCSIS packets using radio frequency signals. The HFC interface 220 can include components operable encapsulate IP packets to produce DOCSIS packets, modulate the DOCSIS packets onto a radio frequency channel and to multiplex or combine multiple RF channels for transmission over the HFC network. The HFC interface 220 can also operate to demodulate radio frequency channels to recover DOCSIS packets received from subscriber devices. In other implementations, the modulation and demodulation functions can be performed by an external device (e.g., a quadrature amplitude modulator (QAM) device).

The CMTS 125 can also include routing logic operable to route packets from the IP network interface 210 to the appropriate service group/channel of the CMTS. The routing logic 230 can similarly operate to route packets received via the HFC interface to an appropriate destination via the IP network interface.

In some implementations, the CMTS 125 can include a low-latency upstream scheduler 240 operable to communicate a transmission schedule to subscribers via the HFC interface 220. In some implementations, the low-latency upstream scheduler 240 can assign a first group of channels to regular DOCSIS packets, while a second group of channels is assigned to short DOCSIS packets. Thus, devices with regular traffic loads will experience standard latency, while devices with small amounts of traffic can experience low latency for transmission of small packets.

The low-latency upstream scheduler 240 can operate in conjunction with a map generator 250 to generate a map for transmission to the subscriber devices. As is understood, the map identifies transmission opportunities for service flows within subscriber devices. When a subscriber device receives a map and matches a transmission opportunity for a particular service flow to a service flow that it controls, the device will use the opportunity to transmit traffic from the identified service flow. Thus, the low-latency upstream scheduler 240 in conjunction with the map generator can assign a service flow with average or large packets the opportunity to transmit on the first group of channels upstream at a particular transmission opportunity, while assigning another service flow with average or large packets the opportunity to transmit on the first group of channels upstream at another transmission opportunity. Similarly, the low-latency upstream scheduler 240 in conjunction with the map generator 250 can assign a service flow with short packets waiting for transmission the opportunity to transmit on a second group of channels upstream at a particular transmission opportunity, while assigning another service flow with short packets waiting the opportunity to transmit on the first group of channels upstream at another transmission opportunity.

In some implementations, a service flow can be classified as having short packets based upon an associated device's requested transmission opportunity. Thus, service flows can by dynamically assigned and reassigned in and out of the short packet classification. In other implementations, a service flow can be statically assigned to be a short packet service flow. Such static classification may be useful for providing a sort of quality of service for service flows that are sensitive to latency.

It should be understood that devices may include multiple service flows, and in some instances, some service flows associated with a device may include a low amount of traffic, while other service flows associated with the device include a high amount of traffic. A service flow may also aggregate traffic from several applications resulting in some short packet traffic bursts and some longer packet traffic bursts. Thus, in some implementations, service flows can be classified as short packet service flow based on the individual service flow without regard to the aggregate amount of data for service flows associated with the device. However, in other implementations, service flows may be classified as short packet service flows based on the aggregate amount of traffic across all service flows associated with the device.

Figure 3:
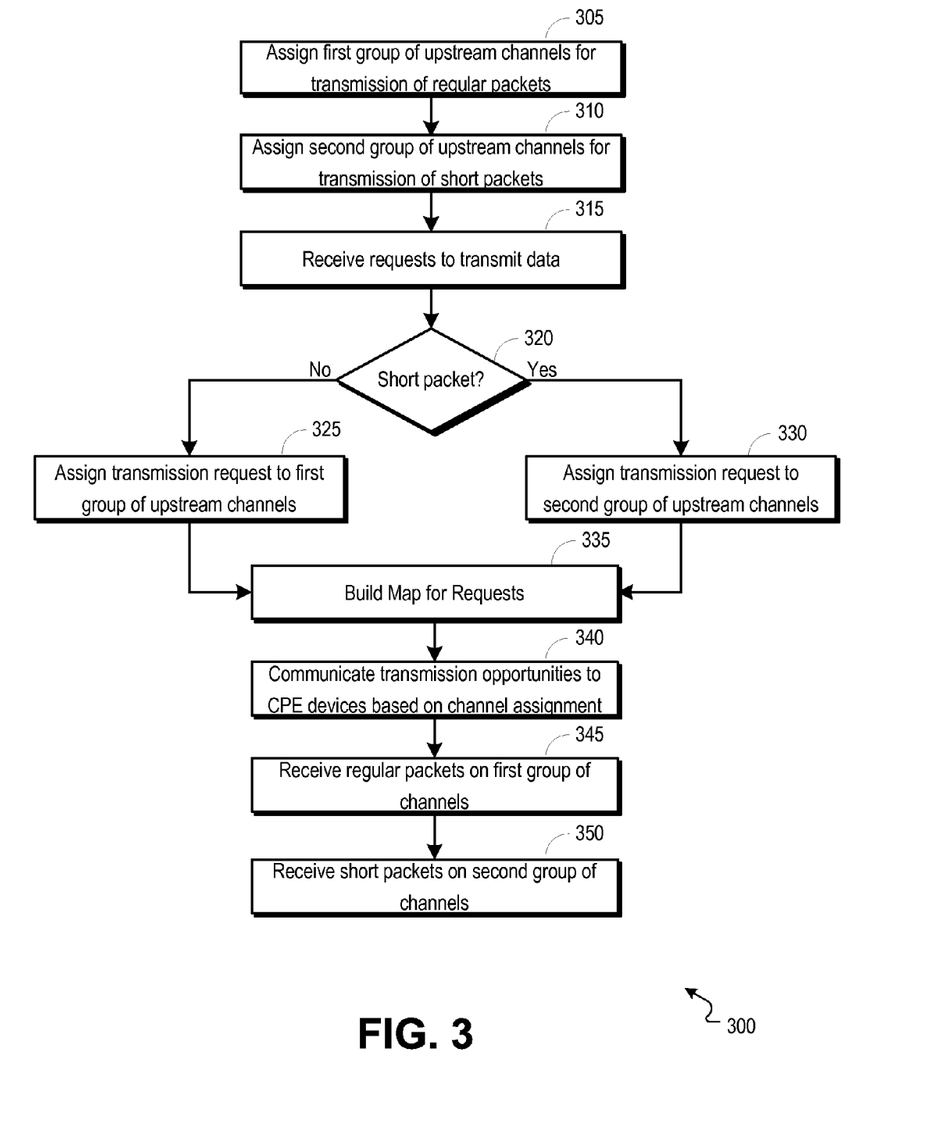
FIG. 3 is a flowchart illustrating a method for low-latency upstream scheduling.

FIG. 3 is a flowchart illustrating a process 300 for low-latency upstream scheduling. At stage 305, a first group of upstream channels are assigned for transmission of regular packets. The first group of upstream channels can be assigned for transmission of regular packets, for example, by a scheduler (e.g., low-latency upstream scheduler 240 of FIG. 2). The scheduler can operate in conjunction with a map generator to assign transmission opportunities to service flows associated with subscriber devices. In some implementations, a substantial majority (e.g., all but one channel) of channels can be assigned for transmission of regular packets.

At stage 310, a second group of channels is assigned for transmission of short packets. The second group of channels can be assigned, for example, by a scheduler (e.g., low-latency upstream scheduler 240 of FIG. 2). The scheduler can operate in conjunction with a map generator to assign transmission opportunities to services associated with subscriber devices. In some implementations, the remainder of channels (e.g., one channel) can be assigned for transmission of short packets. However, in other implementations, there may be finer differentiation possible in the packet sizes that can be accommodated by one or more other groups of channels. For example, the system can accommodate regular packet sizes, medium packet sizes and short packet sizes, whereby the majority of channels are assigned to transmit regular size packets, one channel is assigned to transmit small packets, and two or three channels are assigned to transmit medium size packets.

At stage 315, requests to transmit data are received. The requests to transmit data can be received, for example by the scheduler (e.g., low-latency upstream scheduler 240 of FIG. 2). The requests can include a service identifier operable to link the request to a particular service identifier (SID) used by a requesting device. The requests can also include an identification of an amount of data the particular service is requesting to send.

At stage 320, a determination can be made whether the requests include short packet requests. The determination can be made, for example, by a scheduler (e.g., low-latency upstream scheduler 240 of FIG. 2). In some implementations, the determination can be made by comparing a request to a threshold size. If the request is below the threshold, the request is associated with a short packet. Otherwise the request is associated with non-short packet (e.g., a medium packet or large packet).

If the determination is that a packet is not a short packet, the request can be allocated as a non-short packet request and transmission opportunity(ies) can be assigned in the first group of upstream channels as shown by stage 325. The assignment of transmission opportunity(ies) can be made, for example, by a scheduler (e.g., low-latency upstream scheduler 240 of FIG. 2). If the determination is that a packet is a short packet, the request can be allocated as a short packet request and transmission opportunity(ies) can be assigned in the second group of upstream channels as shown by stage 330. The assignment of transmission opportunity(ies) can be made, for example, by a scheduler (e.g., low-latency upstream scheduler 240 of FIG. 2).

After transmission opportunities are assigned for the various requests, the process 300 proceeds to stage 335 where a map is built for the requests. The map can be built, for example, by a map generator (e.g., map generator 250 of FIG. 2) in conjunction with a scheduler (e.g., low-latency upstream scheduler 240 of FIG. 2). The map can include identification of transmission opportunities by the SID associated with the respective request.

At stage 340, the transmission opportunities are communicated to the CPE devices based on channel assignment. The transmission opportunities can be communicated to the CPE devices, for example, by the scheduler (e.g., low-latency upstream scheduler 240 of FIG. 2) in conjunction with a map generator (e.g., map generator 250 of FIG. 2) via an HFC interface (e.g., HFC interface 220 of FIG. 2). In some implementations, the transmission opportunities are communicated via a map sent to the CPE devices. The map can identify transmission opportunities, for example, using SIDs. In various implementations, services can be classified as short packet flows based on the aggregate number of short packet transmission opportunities requested across all services associated with a device, or based upon the number of short packet transmission opportunities requested for the individual service. Further, services can be classified as short packet flows dynamically, statically, or combinations thereof down to a burst by burst dynamic classification. For example, some services (e.g., voice or video) may benefit from low-latency transmission but may contain a mixture of long and short packets, while best efforts type flows may not require low-latency, but do not require a full transmission opportunity and are thus contribute to network inefficiency. Thus, combinations of dynamic and static classification of short packet services can be valuable.

At stage 345, regular packets are received on the first group of channels. The regular packets can be received on the first group of channels, for example, by an HFC interface (e.g., HFC interface 220 of FIG. 2). Regular packets can be received, for example, from a single service flow per transmission opportunity across the entire group of upstream channels.

At stage 350, short packets are received on the second group of channels. The short packets can be received on the second group of channels, for example, by an HFC interface (e.g., HFC interface 220 of FIG. 2). Short packets can be received, for example, from a single service flow per transmission opportunity across the entire second group of upstream channels. However, it should be understood that the second group of channels is typically a small group (e.g., one channel) in comparison to the first group of channels.

Figure 4:
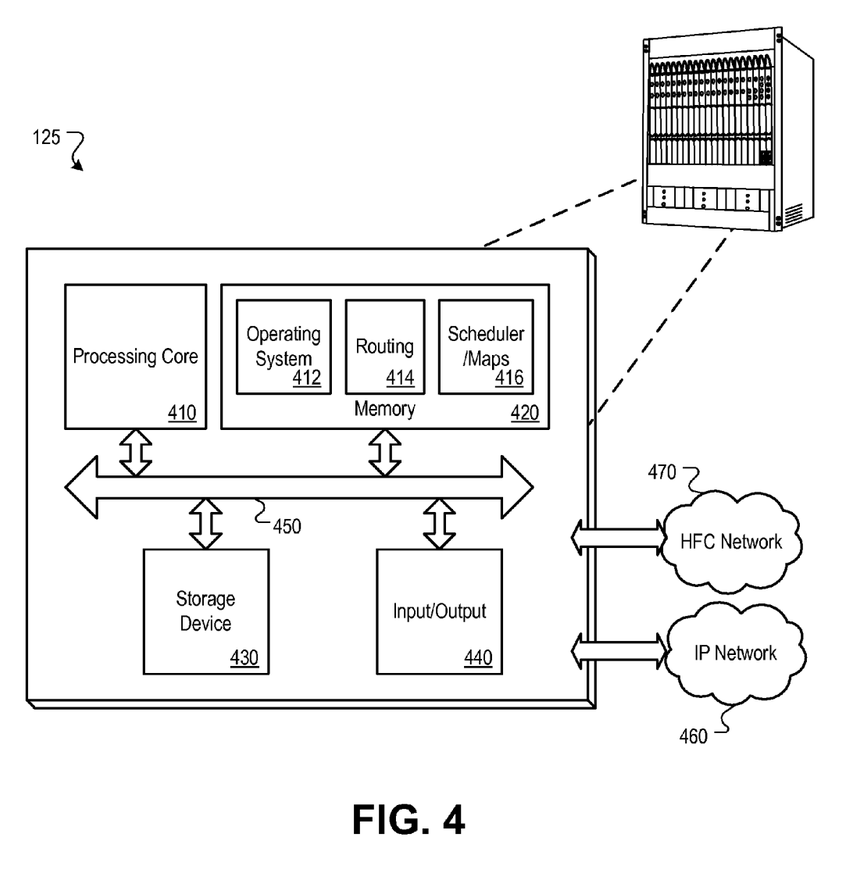
FIG. 4 is block diagram of an example computer architecture operable to provide low latency upstream scheduling.

FIG. 4 is block diagram of an example computer architecture operable to provide low latency upstream scheduling. The CMTS 125 can include a processing core 410, a memory 420, a storage device 430, and an input/output device 440. Each of the components 410, 420, 430, and 440 can, for example, be interconnected using a system bus 450. The processing core 410 is capable of processing instructions for execution within the device 125. In one implementation, the processing core 410 is a single-threaded processor. In another implementation, the processing core 410 is a multi-threaded processor. The processing core 410 is capable of processing instructions (e.g., programs or applications) stored in the memory 420 or on the storage device 430.

The memory 420 stores information within the device 125. The memory 420 can include an operating system 412, routing logic 414, and a scheduler/map generator 416. The operating system can operate to provide a programming environment in which the various programs or other logic in memory can be executed. The routing logic 414 can operate to provide the routing instructions for packets received via the input/output device 440. The scheduler/map generator 416 can include logic operable to schedule transmission opportunities for CPE devices and generate maps to communicate the scheduled transmission opportunities to the CPE devices. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the device 125. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the device 125, e.g., including one or more modulation/demodulation modules, one or more ranging and registration modules, one or more authentication modules, one or more data lock modules, one or more forward error correction modules, etc. In one implementation, the input/output device 440 can include an IP network interface device, e.g., an Ethernet interface, a serial communication device interface, e.g., an RS-232 port, and/or HFC network interface. In another implementation, the input/output device can include driver devices configured to receive input data and send output data to other input/output devices, as well as sending communications to, and receiving communications from various networks (e.g., IP network 460 and/or HFC network 470).

The upstream scheduler of this disclosure typically resides in a cable modem termination system, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   providing a plurality of upstream channels, wherein one or more of the plurality of upstream channels are used to carry upstream communications from one or more subscriber devices to a cable modem termination system;
   assigning a first subset of the plurality of upstream channels for communication of short upstream packets on a network;
   assigning a second subset of the plurality of upstream channels for communication of all other upstream packets on the network, wherein the second subset of the plurality of upstream channels comprises the remainder of the plurality of upstream channels that are not included within the first subset of the plurality of upstream channels;
   wherein the assignment of each respective one upstream channel of the plurality of upstream channels to the first subset or the second subset is not based upon the bandwidth of the respective one upstream channel;
   receiving, at the cable modem termination system, one or more transmission requests from one or more of the one or more subscriber devices;
   determining, at the cable modem termination system, whether each respective one of the transmission requests comprises a short packet request;
   for each respective one of the one or more subscriber devices from which a transmission request is received, scheduling, at the cable modem termination system, a transmission opportunity for the respective one subscriber device, wherein the transmission opportunity comprises an identification of one of the one or more upstream channels along which the respective one subscriber device is to output a transmission associated with a respective transmission request; and
   communicating transmission opportunities from the cable modem termination system to the one or more subscriber devices, whereby subscriber devices from which short packet requests are received are allocated transmission opportunities in the first subset of the plurality of upstream channels, and subscriber devices from which are received transmission requests determined not to comprise a short packet request are allocated transmission opportunities in the second subset of the plurality of upstream channels.

2. The computer-implemented method of claim 1, wherein requests from particular service flows are classified for allocation of a short packet transmission opportunity or a regular packet transmission opportunity based on size of the transmission request from a service flow.

3. The computer-implemented method of claim 2, wherein service flows with small transmission byte requests are allocated one or more short packet transmission opportunities.

4. The computer-implemented method of claim 2, wherein service flows requiring low-latency quality of service are preferentially allocated transmission opportunity on the first subset of the plurality of upstream channels.

5. The computer-implemented method of claim 1, wherein the network comprises a hybrid fiber-coax network using a data over cable service interface specification radio frequency interface channel plan.

6. A cable modem termination system, comprising:
   a low-latency scheduler operable to assign a first subset of a plurality of upstream channels for communication of short upstream packets on a network, and to assign the remainder of the plurality of upstream channels that are not assigned to the first subset of the plurality of upstream channels to a second subset of the plurality of upstream channels for communication of all other upstream packets on the network, the low-latency scheduler being operable to identify transmission opportunities for subscriber devices based on the first and second subset assignments and a determination whether transmission requests received from each respective one of the subscriber devices comprises a short packet request;
   a module configured to determine one or more transmission opportunities for each respective subscriber device from which a transmission request is received, wherein the one or more transmission opportunities comprise an identification of one of the one or more upstream channels along which the respective one subscriber device is to output a transmission associated with a respective transmission request;
   a network interface operable to communicate transmission opportunities to the subscriber devices; and
   whereby subscriber devices from which short packet requests are received are allocated transmission opportunities in the first subset of upstream channels, and subscriber devices from which are received transmission requests determined not to comprise a short packet request are allocated transmission opportunities in the second subset of upstream channels.

7. The system of claim 6, wherein the transmission requests from service flows associated with a device are classified for allocation of a short packet transmission opportunity or a regular packet transmission opportunity.

8. The system of claim 7, wherein service flows with a small amount of traffic are allocated one or more packet transmission opportunities on the first subset of upstream channels.

9. The system of claim 7, wherein service flows with a large amount of traffic are allocated one or more regular packet transmission opportunities on the second subset of upstream channels.

10. The system of claim 7, wherein service flows requiring low latency quality of service are allocated one or more transmission opportunities on the first subset of upstream channels.

11. The system of claim 6, wherein the network comprises a hybrid fiber-coax network using a data over cable service interface specification radio frequency interface channel plan.

12. One or more non-transitory computer readable media operable to execute on a processor, the computer readable being operable to cause the processor to perform the operations comprising:

providing a plurality of upstream channels, wherein one or more of the plurality of upstream channels are used to carry upstream communications from one or more subscriber devices to a cable modem termination system;

assigning a first subset of the plurality of upstream channels for communication of short upstream packets on a network;

assigning a second subset of the plurality of upstream channels for communication of all other upstream packets on the network, wherein the second subset of the plurality of upstream channels comprises the remainder of the plurality of upstream channels that are not included within the first subset of the plurality of upstream channels;

wherein the assignment of each respective one upstream channel of the plurality of upstream channels to the first subset or the second subset is not based upon the bandwidth of the respective one upstream channel;

receiving, at the cable modem termination system, one or more transmission requests from one or more of the one or more subscriber devices;

determining, at the cable modem termination system, whether each respective one of the transmission requests comprises a short packet request;

for each respective one of the one or more subscriber devices from which a transmission request is received, scheduling, at the cable modem termination system, a transmission opportunity for the respective one subscriber device, wherein the transmission opportunity comprises an identification of one of the one or more upstream channels along which the respective one subscriber device is to output a transmission associated with a respective transmission request; and     communicating transmission opportunities from the cable modem termination system to the one or more subscriber devices, whereby subscriber devices from which short packet requests are received are allocated transmission opportunities in the first subset of upstream channels, and subscriber devices from which are received transmission requests determined not to comprise a short packet request are allocated transmission opportunities in the second subset of upstream channels.

13. The one or more non-transitory computer readable media of claim 12, wherein requests from particular service flows are classified for allocation of a short packet transmission opportunity or a regular packet transmission opportunity based on size of the transmission request from a service flow.

14. The one or more non-transitory computer readable media of claim 13, wherein service flows with small transmission byte requests are allocated one or more short packet transmission opportunities.

15. The one or more non-transitory computer readable media of claim 13, wherein service flows requiring low-latency quality of service are preferentially allocated transmission opportunity on the first subset of upstream channels.

16. The one or more non-transitory computer readable media of claim 13, wherein service flows with a small amount of traffic are allocated one or more packet transmission opportunities on the first subset of upstream channels.

17. The one or more non-transitory computer readable media of claim 12, wherein the network comprises a hybrid fiber-coax network using a data over cable service interface specification radio frequency interface channel plan.

\* \* \* \* \*